(12) United States Patent  
Tamas

(10) Patent No.: US 6,941,735 B1  
(45) Date of Patent: Sep. 13, 2005

(54) LANDSCAPE MAINTENANCE DEVICE AND METHOD OF USE THEREOF

(76) Inventor: Florin Tamas, 19 S. Home, Park Ridge, IL (US) 60068

(*) Notice: Subject to any disclaimer, the term of this patent is extended or adjusted under 35 U.S.C. 154(b) by 0 days.

(21) Appl. No.: 10/361,365

(22) Filed: Feb. 10, 2003

(51) Int. Cl.[7] ............................................... A01D 34/64
(52) U.S. Cl. ......................................................... 56/2
(58) Field of Search .............................. 56/13.5, 13.7, 56/2, 16.7, 16.9, DIG. 9

(56) References Cited

U.S. PATENT DOCUMENTS

| | | | |
|---|---|---|---|
| 2,636,568 A * | 4/1953 | Rutishauser | 180/53.1 |
| 3,685,839 A * | 8/1972 | Lambert | 56/11.6 |
| 3,691,860 A * | 9/1972 | Danuser | 474/63 |
| 3,731,476 A * | 5/1973 | Burgess | 56/237 |
| 3,774,321 A * | 11/1973 | David | 37/243 |
| 3,782,085 A * | 1/1974 | Parker et al. | 56/11.6 |
| 3,783,592 A * | 1/1974 | Schraut | 56/13.3 |
| 3,882,615 A * | 5/1975 | Williams | 37/243 |
| 4,170,099 A * | 10/1979 | Owens | 56/16.9 |
| 4,308,676 A * | 1/1982 | Doane | 37/243 |
| 4,446,679 A * | 5/1984 | Thomas | 56/2 |
| 4,597,203 A * | 7/1986 | Middleton | 37/241 |
| 5,052,135 A * | 10/1991 | Fontaine | 37/243 |
| 5,435,118 A * | 7/1995 | Cobile | 56/13.4 |
| 5,604,954 A * | 2/1997 | Webster et al. | 15/330 |
| 5,842,331 A * | 12/1998 | Klee | 56/16.9 |
| 6,006,434 A * | 12/1999 | Templeton et al. | 30/296.1 |

* cited by examiner

Primary Examiner—Robert E. Pezzuto  
Assistant Examiner—Alicia Torres  
(74) Attorney, Agent, or Firm—Francis C. Kowalik

(57) ABSTRACT

A landscape maintenance device having a power unit and a variety of possible dismountable tools. The device allows for the easy transfer of tools onto and off of the power unit by hinge arrangement with the power unit forming one side of the hinge and the tool forming the other side of said hinge. This arrangement allows for an operator to use the wheeled power unit as a lever to raise the tool into a lockable position and releaseably affix same to the power unit. Also shown is a novel arrangement for transferring power between the power unit and the tool unit wherein a drive sheave associated with one unit and a driven sheave associated with a second unit are releaseably engageable by a belt so retained that the belt is positioned when the units are apart to receive a sheave when the units are connected.

7 Claims, 9 Drawing Sheets

LANDSCAPE MAINTENANCE DEVICE AND METHOD OF USE THEREOF

FIELD OF THE INVENTION

The instant invention relates to lawn and garden landscape maintenance tools. More specifically to powered versions of such tools which are capable of being interchangeably driven from a single powerhead.

BACKGROUND OF THE INVENTION

Powered landscape maintenance tools are well known in the art. These range from rotary tillers to string trimmers and the like. Among powered landscape tools, in recent years several manufacturers have realized that several tools can be interchangebly driven from a single motive source, thereby eliminating the need for several engines, each of which could only be used serially by a single user, to drive a multiplicity of toolheads necessary for thorough landscape maintenance. Well known among these are the tools made by BCS S.p.A, an Italian company, and distributed in the United States by BCS America LLC. These implements can be seen on the BCS America website at www.bcs-america.com. With these implements a single powerhead can drive, for example, a snowblower, a sweeper, a rotary or scissor type mower, a shredder or tiller. Another device is distributed by Country Home Products under the name of the DR® Field and Brush Mower. While this is primarily a brush mower, there are available attachments for snowblowing and snowplowing as well as a rotary mower attachment. Similar power take off attachments are available in the product lines of several manufacturers such as Troy-bilt® tillers, and GrassMasters Inc. WorkStation™ line of convertible power washers/generators.

Among patented devices, U.S. Pat. No. 4,597,203 to Middleton describes a convertible snowblower; U.S. Pat. No. 4,104,812 to Stribiak discloses an adaptor for attaching a snowblower to a conventional lawnmower; U.S. Pat. No. 4,833,800 to Ting discloses a combination snowblower and lawn mower; U.S. Pat. No. 4,897,942 to Klas discloses a snowblower with a variable ratio pulley; U.S. Pat. No. 5,090,142 to Peters discloses another means for attaching a snowblower to a lawnmower; U.S. Pat. No. 5,013,282 to Keller discloses a portable tree pruner with an extensible shaft assembly; U.S. Pat. No. 6,006,434 to Templeton et al. discloses a quick release connector for attaching differing toolheads to a power unit; U.S. Pat. No. 4,446,679 to Thomas discloses a multipurpose wheeled implement configured to secure a lawnmower, rotary tiller or snowblower; U.S. Pat. No. 4,308,676 to Doane discloses a lawn mower with a power take-off to drive differing implements and U.S. Pat. No. 4,170,099 to Owens and U.S. Pat. No. 4,896,488 to Duncan disclose rotary lawnmowers with string trimmers affixed thereto.

These various devices suffer from either the inability to attach a wide variety of alternate devices to the power head or, conversely, a difficulty in easily affixing and detaching the various toolheads from the supplied powerhead.

SUMMARY OF THE INVENTION

Therefore, it is a primary object of the instant invention to provide a system for interchangeably powering a plurality of tools from a single powerhead.

It is a further object of the instant invention to provide a method for easily attaching and removing individual tools from the powerhead.

It is another object of the instant invention to provide for a robust means for applying power from the powerhead to the individual tools.

It is a further object of the invention to provide for the attachment and removal of tools from the powerhead by a single individual.

It is another object of the invention to provide for the attachment of tools to the powerhead by means of an application of a downward force to a handle attached to the powerhead.

These and other objects of the instant invention shall be made apparent in the Detailed Description of the Preferred Embodiment and claims appended hereto.

DETAILED DESCRIPTION OF THE PREFERRED EMBODIMENTS

Figure 1:
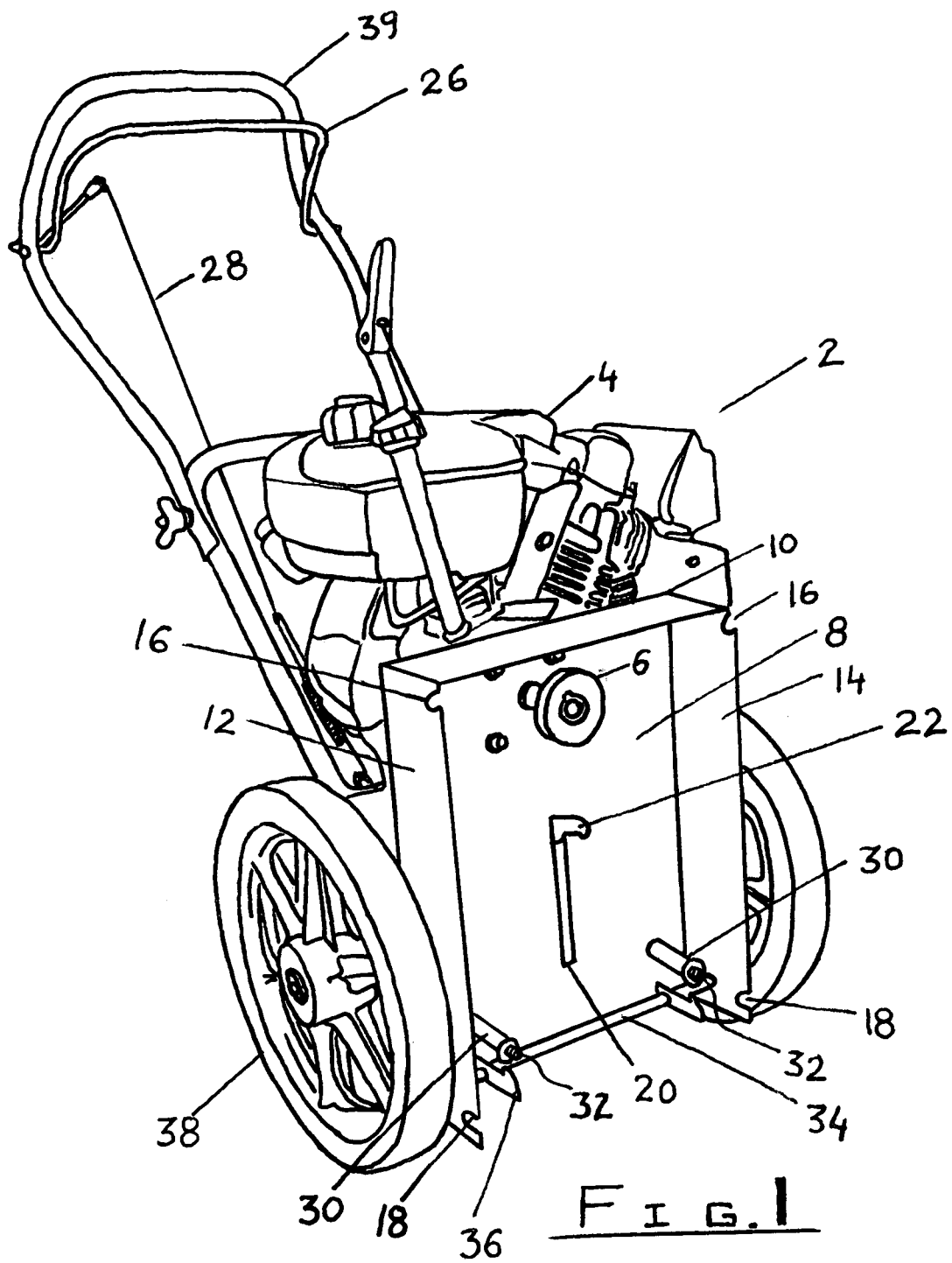
FIG. 1 is a front perspective view of the powerhead portion of the instant invention.

As seen in FIG. 1 the instant invention comprehends a power unit (2) adapted to be removably attached to a variety of tools. The power unit (2) includes a prime mover (4) such as a gasoline engine, electric motor or the like. The prime mover (4) drives an output means (6), preferably a sheave. Output sheave (6) protrudes forwardly from a carriage (8) which is adapted to receive a corresponding member associated with the tool to which the power unit (2) is to be attached.

The carriage (8) comprehends a back plate (10) preferably positioned transverse to the axis of the output sheave (6) and a first carrier (12) and a second carrier (14) located outboard of the back plate (10) and extending forwardly therefrom. The first carrier (12) and the second carrier (14) each have an upwardly oriented pivot slot (16) located on the forward portion of the upper edge of each of the first carrier (12) and the second carrier (14). Additionally each of the first carrier (12) and the second carrier (14) also has defined thereon a lower locator slot (18) which is defined on the forward edge of each of the first carrier (12) and the second carrier (14). The back plate (10) also has defined thereon an access slot (20) which is adapted to house an actuator member (22). The actuator member (22) is adapted to execute a linear motion within the access slot (20) and is preferably actuated by means for an operator moving the engagement lever (26) which in turn operates actuation cable (28), the distal end of which is attached to the actuator member (22), causing linear movement to the actuator member (22). It should be noted here that an arctuate motion of the actuator member would be functionally equivalent to the linear motion herein described.

Figure 2:
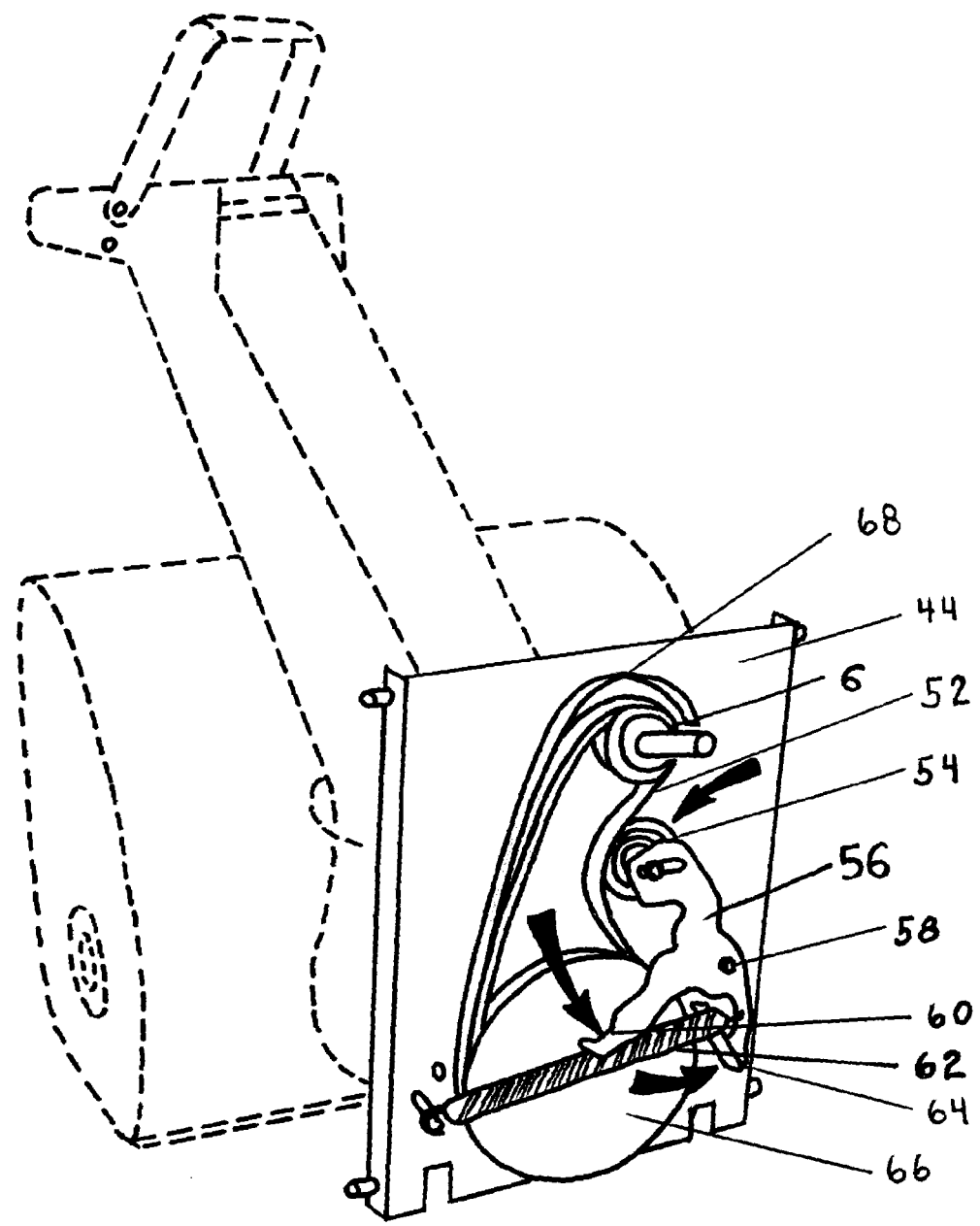
FIG. 2 is a rear perspective view of the tool portion of the instant invention.

Protruding forwardly from back plate (10) are a plurality of standoffs (30) which serve to additionally fix the fore-and-aft separation of the carriage (8) from the dismountable tool assembly (40) shown generally in FIG. 2. The standoffs (30) each circumscribe a threaded fastening (32) which mate with a corresponding threaded receptacle (42) on the tool assembly (40). The carriage (8) also supports a pivoting catch rod (34) which supports a plurality of pawls (36) which are capable of arctuate motion having the catch rod (34) as the axis of rotation therefor. These pawls (36) are spring loaded to bias them upwardly and are manually retractable into a downward position.

The power unit (2) also comprehends wheels (38) which may be driven by the prime mover (4) and an operator handle (39) which extends rearwardly from the power unit (2).

The tool assembly (40), best seen in FIG. 2, comprehends a receiving plate (44) which is attached to the tool proper. The receiving plate (44) is adapted to fit within the forwardly projecting carriers (12,14) of the carriage (8). The receiving plate (44) supports a plurality of pivot pins (46) which are adapted to be received in pivot slots (16) on the carriers (12,14) so as to allow the receiving plate (44) to be pivotably engageable with the carriage (8). Additionally, the receiving plate (44) supports laterally extensive locator pins (48) which are adapted to engage locator slots (18).

The receiving plate (44) has defined thereon a plurality of threaded receptacles (42) which, as noted before, are adapted to receive the threaded fastenings (32) heretofore described. Furthermore, the receiving plate (44) has, on its lower edge, defined a plurality of pawl catches (50) which are adapted to engage the pawls (36) and releaseably hold the lower edge of the receiving plate (44) to the carriage (8) with the minimum distance therebetween being defined by the forward extension of the standoffs (30).

As seen in FIG. 2 the receiving plate (44) also supports the means for transferring power from the drive sheave (6) to the tool. A belt (52) receives power from the drive sheave (6). This belt (52) can be alternately engaged and disengaged by varying the tension thereof. This variation in tension is accomplished by means of an idler (54) which is carried by a moveable bracket (56). This bracket (56) is pivotable about a mounting pin (58) and supports the idler (54) in a disengageable relationship with the belt (52). The bracket (56) further comprehends an actuator lever (60) which is adapted to be engaged by the actuator member (22) when the receiving plate (44) is attached to the carriers (12,14). Movement of the actuator member (22) against the actuator lever (60) moves the idler (54) towards the belt (52) thereby increasing tension thereon. Bracket (56) is biased so as to hold the idler (54) away from belt (52) by biasing spring (62). The lower end of the bracket (56) further comprehends a brake (64) which is normally biased by spring (62) to rest on the belt (52) and the driven sheave (66) thereby effecting a rapid cessation of motion of the associated tool when movement of the idler (54) interrupts transfer of power from drive sheave (6) to the driven sheave (66) by relieving tension from the belt (52). The belt (52) is further held in a position adapted to receive the drive sheave (6) when the receiving plate (44) is connected to the carriers (12, 14) by means of a curvilinear belt retainer (68) thereby allowing the power unit (2) to be alternately removed and affixed from the tool assembly (40) without the necessity of rethreading belt (52) about drive sheave (6) whenever a tool assembly (40) is changed.

Figure 3:
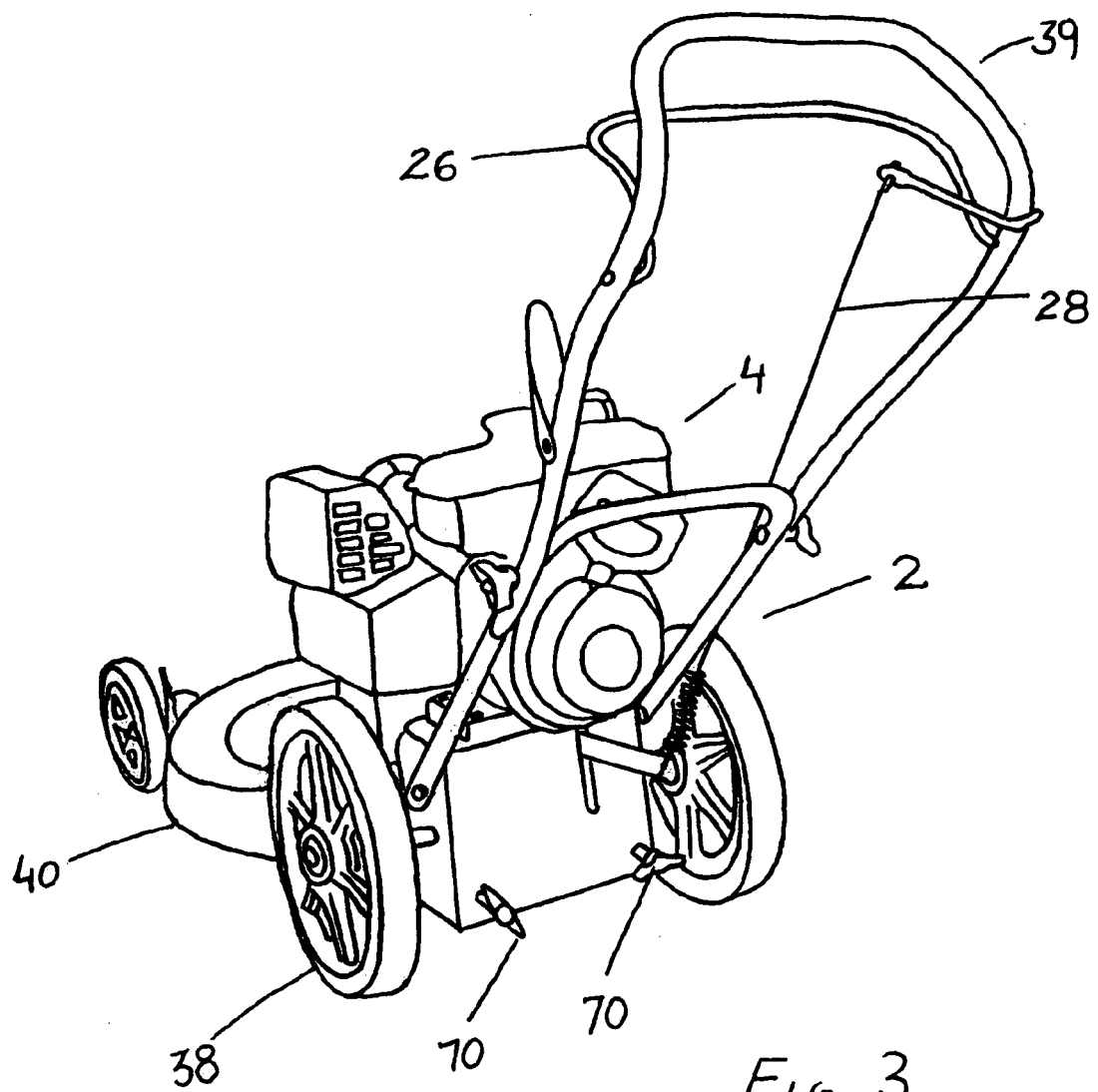
FIG. 3 is a rear perspective view of the powerhead of the instant invention.
Figure 4:
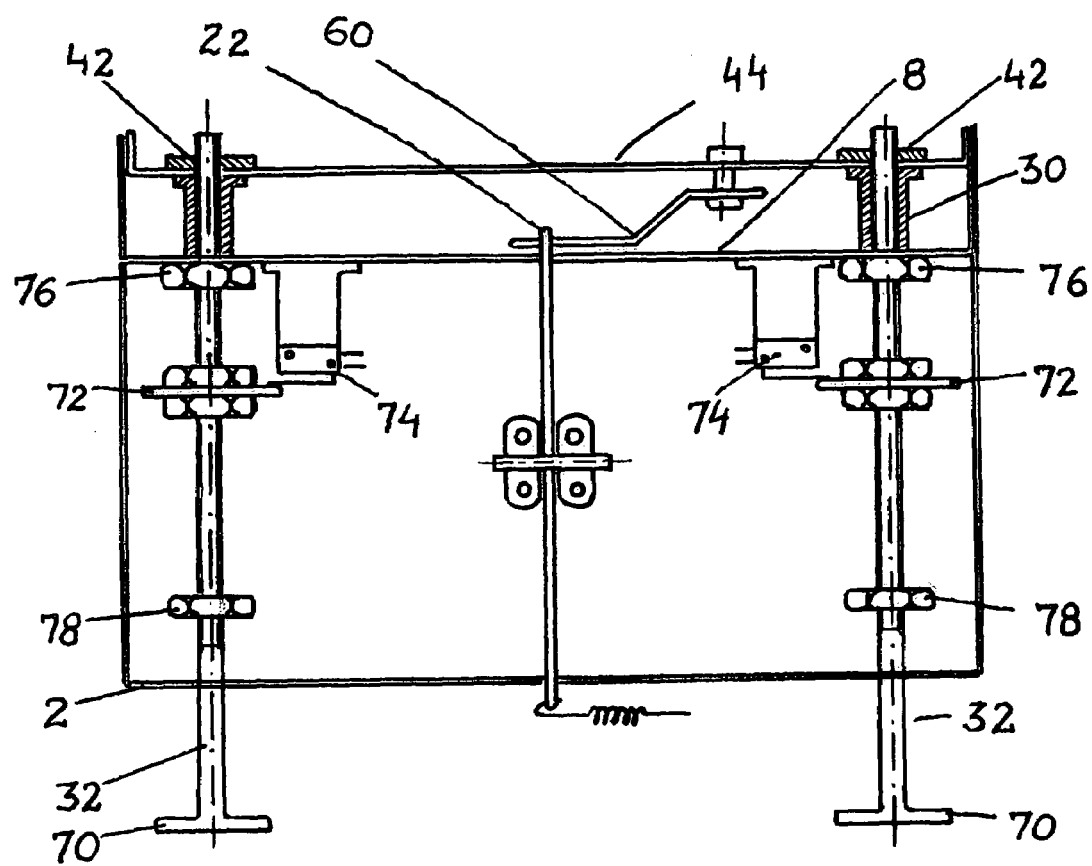
FIG. 4 is a plan view of the lower attachment assembly of the instant invention.
Figure 5:
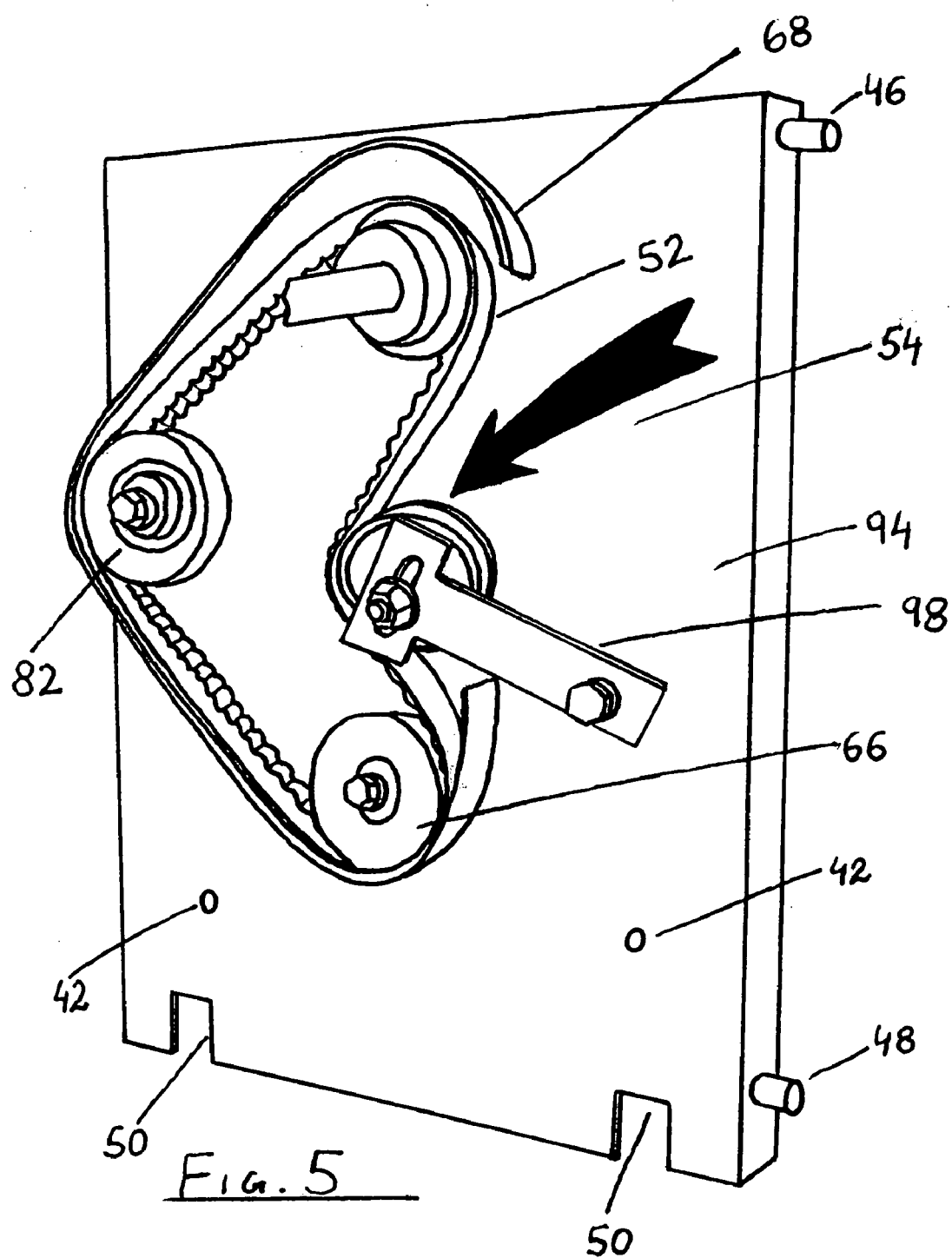
FIG. 5 is a rear perspective view of the tool portion of the instant invention showing an alternative embodiment of the drive mechanism.

As best seen in FIGS. 3 and 4 an additional safety feature is incorporated into the device. Threaded fastenings (32) are actuated by hand wheels (70) to more firmly affix the carriage (8) to the receiving plate (44) by threading into the threaded receptacles (42). Additionally, the threaded fastenings (32) comprehend annular fingers (72) which move in a fore-and-aft direction as the threaded fastenings (32) are engaged or disengaged from threaded receptacles (42). These annular fingers (72), in turn, actuate switches (74) which are preferably wired in series into the ignition circuit of the engine (4) or appropriately for other prime movers so as to assure that the prime mover (4) cannot operate unless the threaded fastenings (32) are fully engaged with the threaded receptacles (42). The annular fingers (72) are located between forward stops (76) and rear stops (78) which retain the threaded fastenings within the power unit (2). Also shown in FIG. 4 is the actuation linkage (80) for the actuator member (22).

Figure 6A:
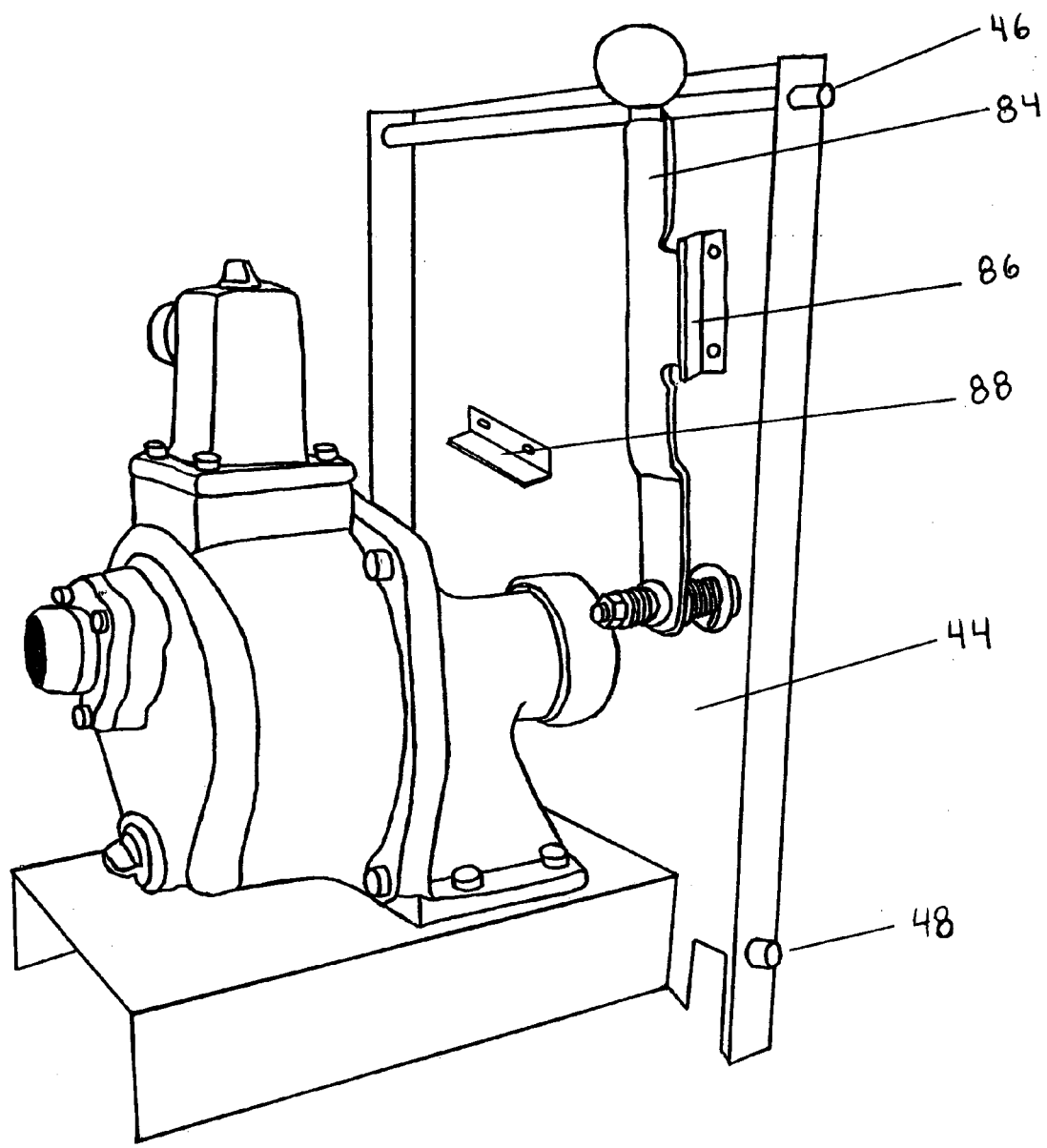
FIG. 6A is a perspective view of the tool portion of the instant invention showing the adaptation of the power transfer means for tools which do not require operator attendance.
Figure 6B:
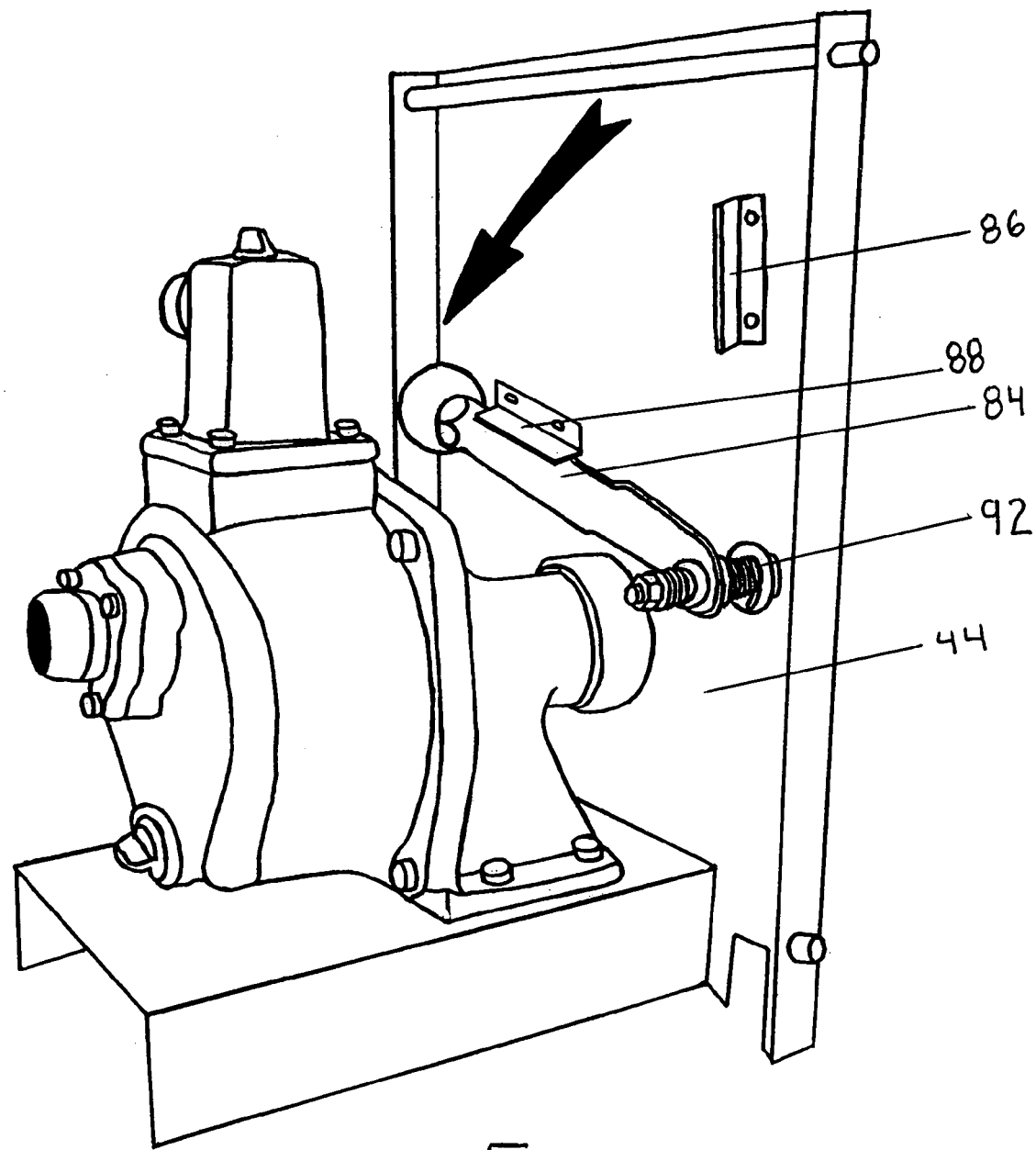
FIG. 6B is a perspective view of the adaptation shown in FIG. 6A showing the control lever engaged.
Figure 7:
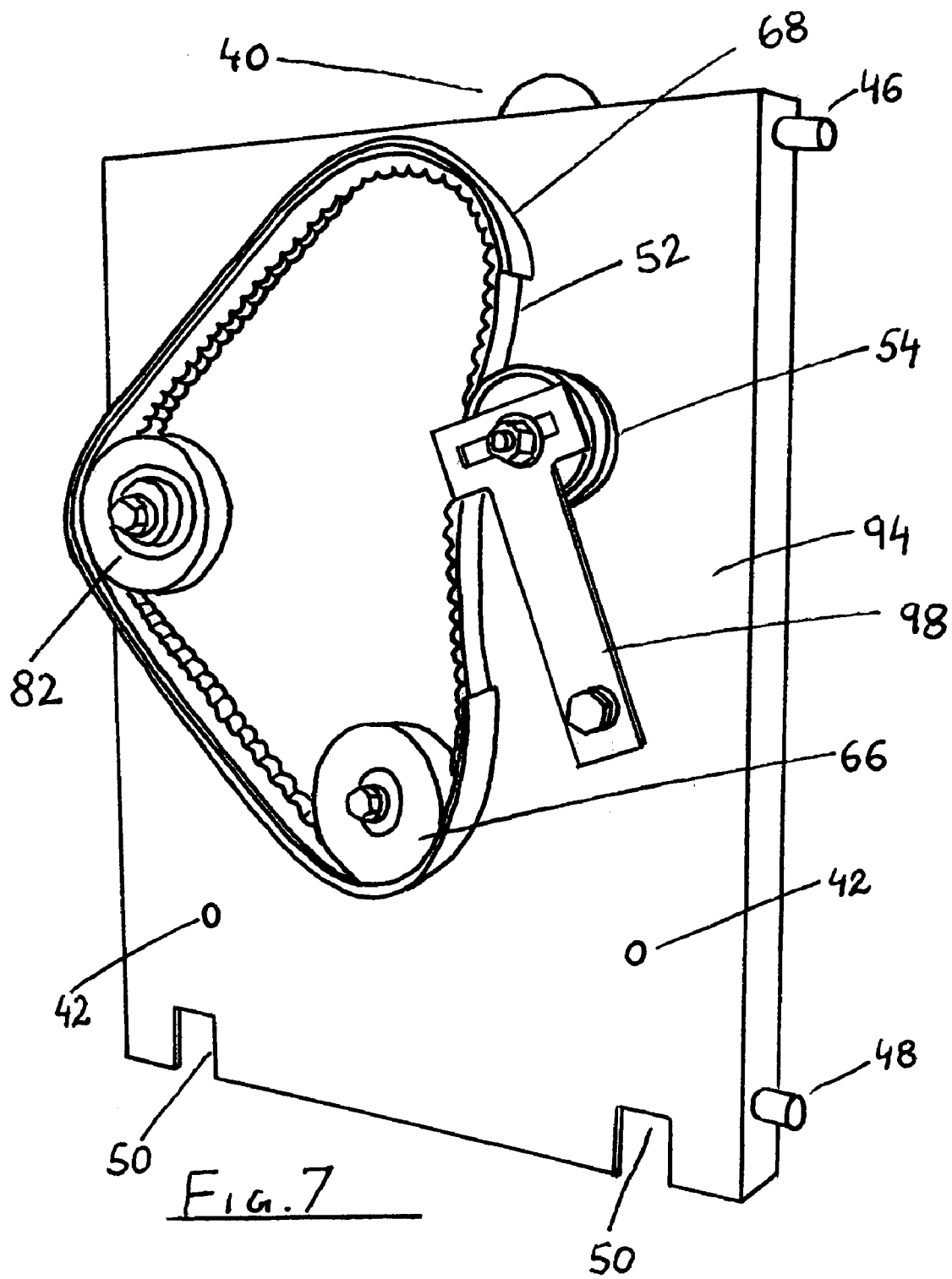
FIG. 7 is a rear perspective view of the adaptation of FIG. 6A showing the drive belt disengaged.
Figure 8:
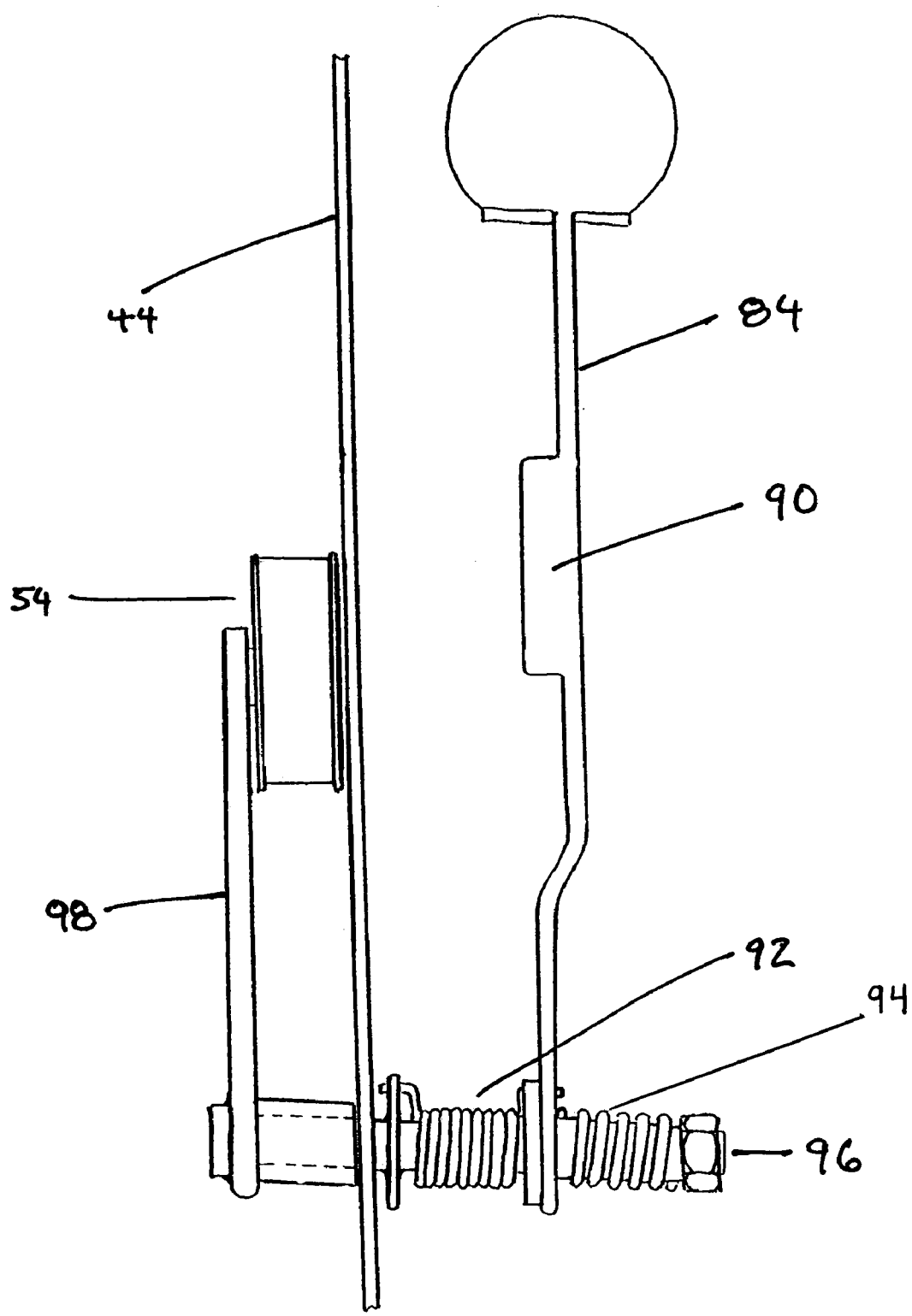
FIG. 8 is a plan view if the control lever shown in FIGS. 6 and 7.

FIGS. 6 and 7 show the alternative embodiment for tools that require a tool drive speed similar to engine speed. As can be seen, the belt (52) travels over an additional fixed idler (82) and a control lever (84) is mounted on the receiving plate (44). Two engageable stops (86,88) allow the control lever (84) to be locked in either an engaged position or a disengaged position. As best seen in FIG. 8, the control lever (84) comprehends a tang (90) to interface with the engageable stops (86,88) as well as a lever biasing spring (92) to bias the control lever to a disengaged position. A retaining spring (94) allows the control lever (84) to move longitudinally on the lever shaft (96) to allow for engagement and disengagement of tang (90) with the associated engageable stop (86,88). The lever shaft (96) actuates an idler arm (98) and an associated idler (54).

In operation, an operator would move the power unit (2) into a position such that the carriers (12, 14) are aligned with receiving plate (44) of the tool assembly (40). The pivot slots (16) on the carriers (12, 14) are aligned with the pivot pins (46). The power unit (2) is then tilted by pressing down on the operator handle (39) so as to rotate the power unit (2) about an axis defined by the centers of the wheels (38). This motion raises the carriage (8) thereby engaging the pivot pins (46) into the pivot slots (16) forming a hinge between the carriage (8) and the receiving plate (44). Further rotation of the power unit (2) closes this formed hinge and as the interstice between the carriage (8) and the receiving plate (44) closes, the pawls (36) come into engagement with the pawl catches (50) and latch thereto under action of the associated biasing spring. Vertical relative movement between the carriage (8) and the receiving plate (44) is restrained by the substantially simultaneous engagement of the locator pins (48) in the locator slots (18). With the receiving plate (44) in engagement with the carriage (8), threaded fastenings (32) are now driven into threaded receptacles (42) thereby firmly affixing the tool assembly (40) to the power unit (2) as well as actuating switches (74) by the advancement of the annular fingers (72). After commencing movement of the drive sheave (6), the operator actuates the idler (54) either by moving actuator (22) by moving engagement lever (26) or by moving control lever (84) to the engaged position. Disassembly of the power unit (2) and the tool assembly (40) occurs in essentially reverse order to the assembly described.

This description of the presently preferred embodiments is indicative of the instant invention and is not intended to limit the scope thereof to any extent greater than recited in the claims appended hereto.

What is claimed is:

1. In a landscape maintenance device having a power unit and a dismountable tool affixable thereto, wherein said power unit is adapted to releaseably engage said dismountable tool and provide motive power thereto, a method of engaging said power unit to said dismountable tool comprising the following steps:
   A) providing a power unit having a carriage and a carrier associated therewith;
   B) providing a dismountable tool having a receiving plate associated therewith;
   C) providing a first pivot member located at the top of said carriage;
   D) providing a second pivot member located at the top of said receiving plate and engageable with said first pivot member;
   E) providing a latch located opposite said first and second pivot members associated with said carriage and said receiving plate;
   F) aligning said first pivot member with said second pivot member;
   G) rotating said power unit about an axis so as to raise said carriage upwardly and engage said first pivot member with said second pivot member;
   H) wherein said power unit carriage, said engaged pivot members and said receiving plate associated with said tool define a hinge having an upwardly oriented vertex, rotating said power unit to raise said vertex upward so as to close said hinge; and
   I) effecting locking of said carriage and said receiving plate with said latch as said hinge is closed.

2. The method of claim 1 and the reverse of said steps being effective to release said tool from said power unit.

3. The method of claim 1, wherein said power unit has a drive member, operative to transmit power therefrom and said tool has a driven member, operative to receive power thereto, the step of rotating said power unit so as to close said hinge placing said drive member and said driven member into a position allowing a selectable transmission of power therebetween.

4. The method of claim 1, wherein said power unit and said tool are adapted to be connected by fastenings, and connecting said fastenings.

5. The method of claim 4, wherein said fastenings further comprise means for enabling the operation of a prime mover associated with said power unit only when said fastenings are engaged with said tool, enabling said prime mover.

6. The method of claim 3 and said selectable transmission of power between said power unit and said tool being selected by engaging a belt between said drive member and said driven member.

7. The method of claim 6 and said selectable transmission of power between said power unit and said tool being deselected by disengaging a belt between said drive member and said driven member.

* * * * *